United States Patent [19]
Yoshida et al.

[11] Patent Number: 5,401,917
[45] Date of Patent: Mar. 28, 1995

[54] INPUT PEN ACCOMMODATION MECHANISM FOR TABLET INPUT APPARATUS

[75] Inventors: Tatsuo Yoshida, Kanagawa; Kazuhiko Otake, Tokyo, both of Japan

[73] Assignee: Sony Corporation, Tokyo, Japan

[21] Appl. No.: 44,143

[22] Filed: Apr. 7, 1993

[30] Foreign Application Priority Data

Apr. 9, 1992 [JP] Japan .................................. 4-115274

[51] Int. Cl.⁶ ............................................. G08C 21/00
[52] U.S. Cl. ....................................... 178/18; 345/179
[58] Field of Search ..................... 178/15, 19, 20, 87; 382/3; 345/179, 156, 901–903; 364/709.01, 709.1, 709.11; D19/52, 35, 41, 45

[56] References Cited

U.S. PATENT DOCUMENTS

| | | | |
|---|---|---|---|
| D. 327,498 | 6/1992 | Watson et al. | D19/52 |
| 4,927,986 | 5/1990 | Daly | 178/18 |

FOREIGN PATENT DOCUMENTS

| | | |
|---|---|---|
| 0419177A3 | 3/1991 | European Pat. Off. . |
| 0435511A3 | 7/1991 | European Pat. Off. . |
| WO91/17493 | 11/1991 | WIPO . |

Primary Examiner—Stephen Chin
Assistant Examiner—Paul Loomis
Attorney, Agent, or Firm—Limbach & Limbach; Philip M. Shaw

[57] ABSTRACT

An input pen accommodation mechanism for use with a tablet input apparatus. The mechanism comprises a pen accommodation part for accommodating an input pen for coordinate data input, and holding members for holding the input pen as accommodated in the pen accommodation part. The holding members are in elastic contact with the input pen. The pen accommodation part is constituted by a first concave portion and a second concave portion deeper than the first concave portion, the two portions being connected lengthwise. The holding members are located within the first concave portion so as to pinch the input pen sideways within the pen accommodation part.

22 Claims, 10 Drawing Sheets

INPUT PEN ACCOMMODATION MECHANISM FOR TABLET INPUT APPARATUS

BACKGROUND OF THE INVENTION

1. Field of the Invention

The present invention relates to a novel input pen accommodation mechanism for use with a tablet input apparatus. More particularly, the invention relates to an input pen accommodation mechanism having a pen accommodation part with concave portions at least large enough to accommodate approximately the entire input pen, the mechanism allowing the pen to be easily inserted and extracted thereto and therefrom, the pen being held in a stable manner when inserted inside.

2. Description of the Related Art

FIG. 9 is a perspective view of a typical related art input pen accommodation mechanism for use with a tablet input apparatus. In FIG. 9, reference character a indicates an enclosure of a tablet input apparatus. One side of the enclosure a has a holder c for holding an input pen b.

The holder c is constituted by a rectangular base d and two elastic pieces e projecting outward from the base d. One elastic piece e projects from the upper edge portion of the base d, the other from the lower edge portion thereof. The length of the base d is about one-third of that of the input pen b. The vertical width of the base d is about twice the diameter of the input pen b.

The two elastic pieces e are approximately the same in length as the base d. The elastic pieces e have those middle portions, in their projecting direction, which face each other and which are formed into concave surfaces stretching sideways to the full width of each piece. The distance between the two concave surfaces of the elastic pieces e is slightly smaller than the thickness of the input pen b.

When the input pen b is to be held to the side of the enclosure a, the pen is placed in the holder c so that the shaft of the pen b will be pinched between the two elastic pieces e.

FIG. 10 is a plan view of another typical related art input pen accommodation mechanism for use with a tablet input apparatus. In FIG. 10, reference character f indicates a pen case having a concave portion opened at its top. The concave portion of the pen case f is sufficiently greater in shape than the input pen b.

The pen case f has in the middle of its length a cutout g large enough for a human finger to enter. The pen case f is attached to one side of the enclosure a of the tablet input apparatus.

When the input pen b is to be accommodated in the pen case f, the pen b is dropped into the pen case f.

For removal from the pen case f, a finger is put downward into the cutout g to lift the input pen b from the pen case f. Once the input pen b is lifted slightly above the pen case f, the entire pen is gripped by hand and removed.

Problem Intended to Be Solved by the Invention

One disadvantage of the related art input pen accommodation mechanism shown in FIG. 9 is that the input pen b is exposed from the enclosure a. The input pen b is thus subject to inadvertent contact with nearby objects. Such contact often dislodges and knocks off the input pen b from the holder c.

One solution to the above disadvantage would be to increase the holding force of the holder c so that casual contact will not dislodge the input pen b therefrom. The higher the holding force of the holder c, the more strenuous the effort required to attach and detach the input pen b to and from the holder c. Thus the table input apparatus needs to be held securely with a considerable effort whenever the input pen b is returned to or removed from the holder c.

With the related art input pen accommodation mechanism shown in FIG. 10, the input pen b is not exposed. With this mechanism, it is easier to return and remove the input pen b to and from the pen case than with the mechanism of FIG. 9. The problem with the mechanism of FIG. 10 is that the input pen b easily falls from its pen case f when the tablet input apparatus is tilted or upturned.

SUMMARY OF THE INVENTION

It is therefore an object of the present invention to overcome the above-described drawbacks and disadvantages of the related art and to provide a novel input pen accommodation mechanism for use with a tablet input apparatus, the mechanism allowing the pen to be easily inserted and extracted thereto and therefrom, the pen being held in a stable manner when inserted inside.

In carrying out the invention and according to one aspect thereof, there is provided an input pen accommodation mechanism for use with a tablet input apparatus, the input pen accommodation mechanism comprising: a pen accommodation part for accommodating an input pen for coordinate data input; and holding means for holding the input pen as accommodated in the pen accommodation part, the holding means being in elastic contact with the input pen; wherein the pen accommodation part is constituted by a first concave portion and a second concave portion deeper than the first concave portion, the first and the second concave portions being connected lengthwise, the holding means being located within the first concave portion so as to pinch the input pen sideways within the pen accommodation part.

As outlined, the input pen accommodation mechanism for use with the tablet input apparatus according to the invention has the pen accommodation part with the concave portions inside. The input pen accommodated in the concave portions is not exposed and will not be dislodged and fall off upon contact with nearby objects. There is no need to increase the holding force of the pen holding means higher than a minimal necessary level. It thus takes no extra effort to attach and detach the input pen to and from the pen accommodation part; to do so is easy and comfortable.

The pen accommodation part is made of the two concave portions of different depths. With this structure, the input pen is taken out of the pen accommodation part as follows. That part of the input pen which is located in the second concave portion (i.e., the deeper portion) is first pushed in by fingertips. The pushing action causes the input pen to rotate around a fulcrum formed by the boundary between the first and the second concave portions. Upon rotation, that part of the input pen which is located in the first concave portion is lifted therefrom. The lifted end of the input pen is then gripped by fingers and the entire input pen is detached with ease.

These and other objects, features and advantages of the invention will become more apparent upon a reading of the following description and appended drawings.

DESCRIPTION OF THE PREFERRED EMBODIMENT

One preferred embodiment of the invention will now be described in detail with reference to the accompanying drawings.

Figure 1:
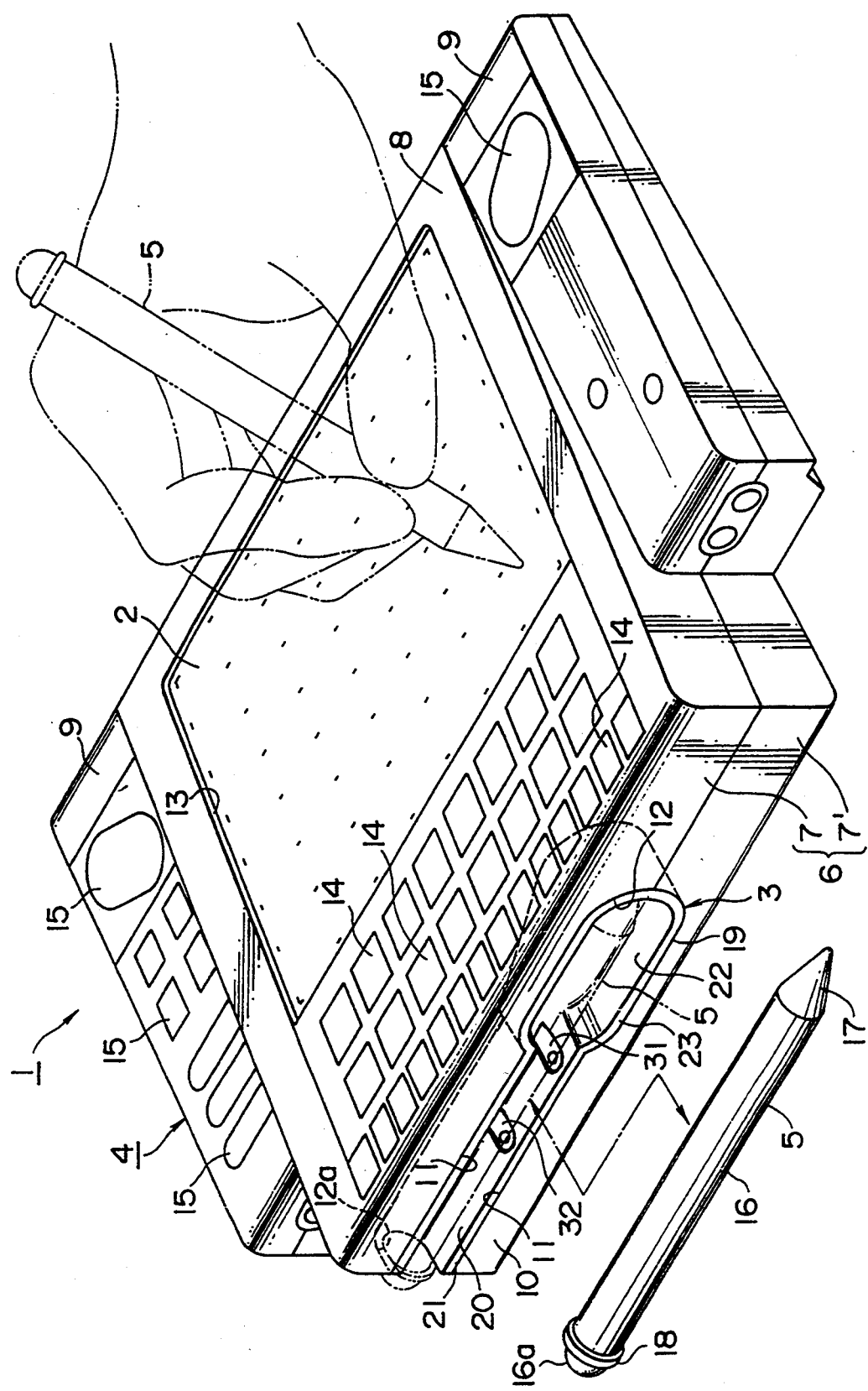
FIG. 1 is a perspective view of an input pen accommodation mechanism for use with a tablet input apparatus, the mechanism embodying the invention.
Figure 2:
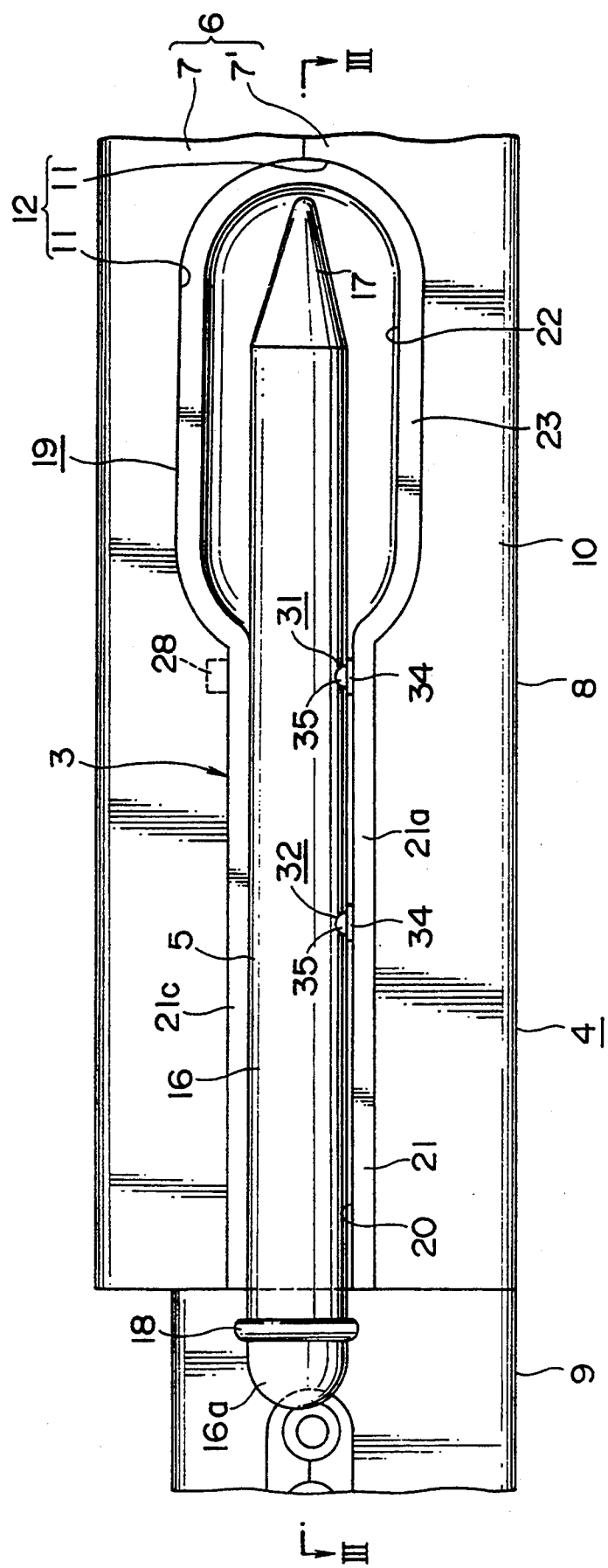
FIG. 2 is an enlarged rear view of major components of the tablet input apparatus.

FIG. 1 is a perspective view of an input pen accommodation mechanism for use with a tablet input apparatus, the mechanism embodying the invention. In FIG. 1, reference numeral 1 is the tablet input apparatus comprising a pressure sensitive tablet 2, a body 4 containing the input pen accommodation mechanism 3 and other components, and an input pen 5 for drawing images on the tablet 2.

Reference numeral 6 indicates an enclosure of the body 4. The enclosure 6 is made of an upper half portion 7 whose bottom is opened and a lower half portion 7' whose top is opened. The two half portions 7 and 7' combine, with their openings facing each other, to form an approximate square when viewed from above. The combination constitutes a relatively thin square box called a main enclosure 8. The main enclosure 8 is flanked on both sides by side enclosures 9 projecting outward therefrom. (In FIG. 1, the area toward the top left corner is called the left-hand side of the apparatus; toward the bottom right corner, the right-hand side; toward the bottom left corner, the back side; toward the top right corner, the front side. These directions apply hereinafter.)

The top of the enclosure 6 is elevated progressively toward the back side. The rise translates into the height of a back wall 10 of the main enclosure 8 being about four times the diameter of the input pen 5.

Reference numerals 11 denote cutouts made individually into the butting parts of the back wall 10 that belongs to each of the upper and lower half portions 7 and 7'. The cutouts 11 constitute an aperture 12 when the two half portions 7 and 7' are put together. The aperture 12 conforms substantially to the back shape of a pen accommodation case, to be discussed later, of the input pen accommodation mechanism 3. The length of the aperture 12 is about two-thirds of that of the back wall 10. The left-hand end of the aperture 12 opens at the vertical center of the left-hand side wall belonging to the main enclosure 8.

Reference numeral 12a indicates a U-shaped aperture formed at the back end of the left-hand side wall of the main enclosure 8. The back end is formed so as to continue to the left-hand end of the aperture 12.

Reference numeral 13 indicates a large window formed over an area close to the front end of the top wall belonging to the main enclosure 8. The tablet 2 is so furnished as to close the window 13 from the interior.

Reference numerals 14 denote push-buttons for designating previously prepared choices such as fonts, ruled line types, colors and character ornaments. These buttons are disposed at the back of the window 13 on the top surface of the main enclosure 8. Various push-buttons are also disposed at the top of the side enclosures 9.

The input pen 5, whose body is made of synthetic resin, 2has a cylindrical main portion 16 ending at one end with a conical part 17. The other end 16a of the main portion 16 is furnished with a flange 18.

Images are drawn on the tablet 2 as follows. The tip of the conical part 17 of the input pen 5 is first pressed lightly by hand onto the tablet 2 and is moved thereon as desired (see FIG. 1). Then pushing any of the push-buttons 15 enters the drawn image as a designated image signal into the apparatus.

The input pen accommodation mechanism 3 comprises a pen accommodation case for accommodating the input pen 5, two holding pieces for holding the input pen 5 as accommodated in the pen accommodation case, and a spring. Reference numeral 19 indicates the pen accommodation case whose parts are made integrally of synthetic resin.

The pen accommodation case 19 comprises a first case body 21 having a first concave portion 20 that opens at the back as well as at the left- and right-hand side. Also included in the pen accommodation case 19 is a second case body 23 having a second concave portion 22 that opens at the left-hand side and at the back. The left-hand side opening of the second concave portion 22 continues to the right-hand side of the first concave portion 20 of the first case body 21. The second concave portion 22 becomes progressively deeper. (i.e., gouged toward the front) the closer to its right-hand side. The first case body 21 and the second case body 23 are formed integrally.

The first case body 21 has a recumbent U shape when viewed from the left or from the right. The vertical width of the first concave portion 20 is slightly greater than the diameter of the input pen 5. The length of the first case body 21 is about 1.5 times that of the second case body 23.

The second case body 23 has an approximately oval shape when viewed from the back. The vertical width of the second case body 23 excluding its left- and right-hand parts is approximately twice that of the first concave portion 20. The interior of the second case body 23 continues to that of the first case body 21.

Reference numerals 24 indicate two case attaching members projecting forward, one provided near the front left-hand side of the first case body 21, the other furnished close to the front right-hand side of the second case body 23. The two attaching members 24 have attaching holes 24a vertically made therethrough.

Reference numeral 25 denotes a support member projecting forward and ranging from the front right-hand half of the first case body 21 to the front left-hand part of the second case body 23. The support member 25 supports holding pieces, to be described later.

Reference numerals 26 indicate two holding piece accommodation holes, one provided at the approximate crosswise center of a bottom wall 21a of the first case body 21, the other furnished at the right-hand end of the bottom wall 21a. Each holding piece accommodation hole 26 is rectangular longitudinally when viewed from below. The rear ends of the holes 26 are formed near the back edge of the bottom wall 21a, and their front ends cut into the bottom edge of a curved front side wall 21b of the first case body 21.

Figure 5:
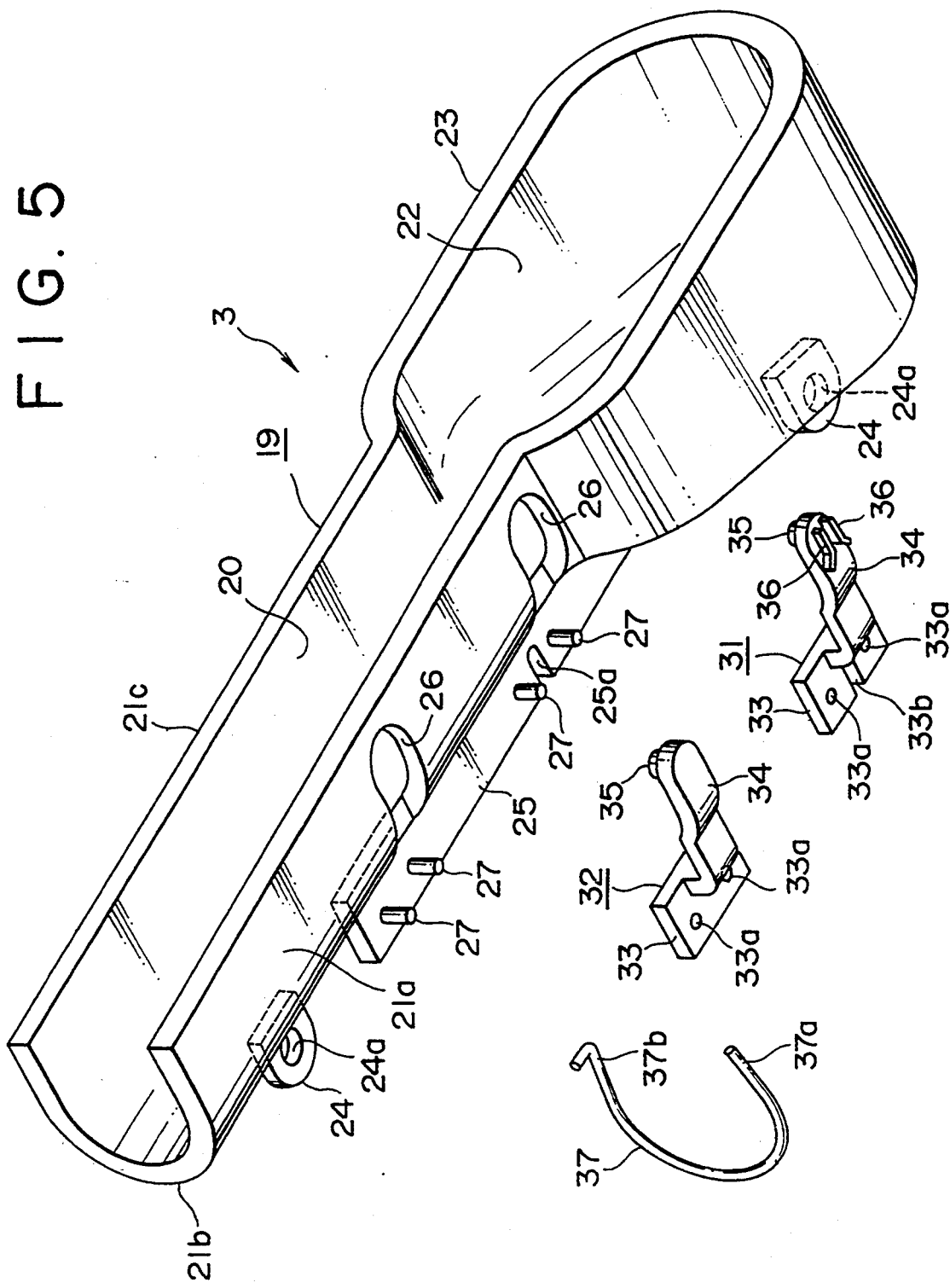
FIG. 5 is an enlarged perspective view of the input pen accommodation mechanism as it is exploded.

From the support member 25, four small, cylindrical-projections 27 extend perpendicularly downward (see FIG. 5). Two of the four projections 27, slightly separated sideways from each other, correspond to one of the holding piece accommodation holes 26. The other two projections 27, also slightly separated sideways, correspond to the other holding piece accommodation hole 26. On the support member 25 and between the two right-hand side projections 27 is a small cutout 25a whose front end reaches the front edge of the member 25.

On top of the top wall 21c of the first case body 21 and above the right-hand holding piece accommodation hole 26 are three check members 28 projecting upward. One check member 28a is located close to and in parallel with the rear edge of the top wall 21c. The other two check members 28b are located in front of and slightly away from the member 28a. The two check members 28b, in parallel with each other, are perpendicular to the member 28a and extend in the forward direction.

Figure 4:
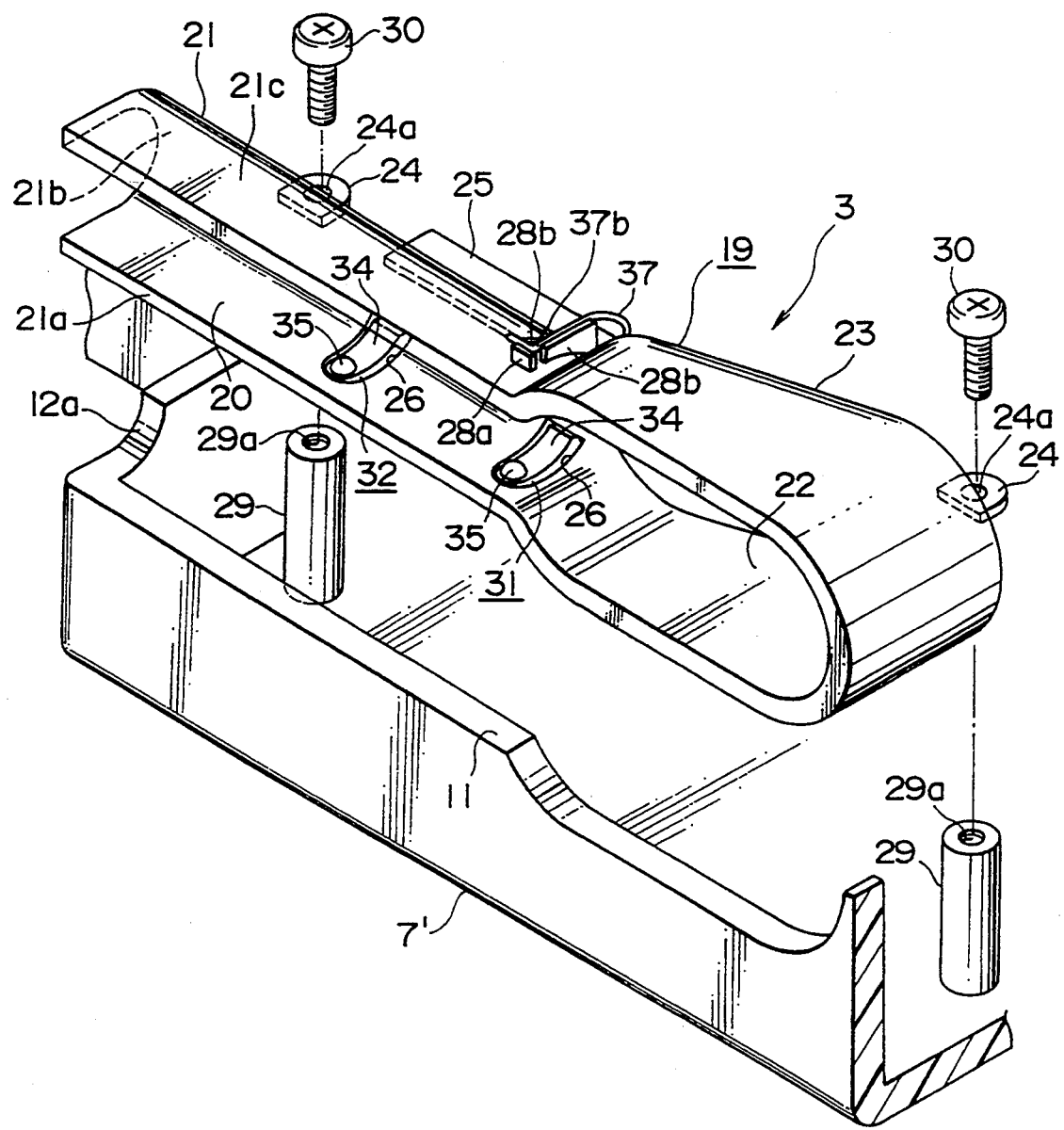
FIG. 4 is an enlarged perspective view of major components of the embodiment, with the lower half portion of the apparatus enclosure detached from the input pen accommodation mechanism.

Reference numerals 29 denote cylindrical support projections (see FIG. 4) extending upward from the bottom wall of the lower half portion 7'. The support projections 29 are located slightly in front of the left- and right-hand ends of the cutouts 11 in the back wall 10 of the main enclosure 8. Threaded holes 29a are formed at the tops of the support projections 29.

Before the upper and lower half portions 7 and 7' are put together, the pen accommodation case 19 is fastened to the lower half portion 7' as follows. The rear edges of the first and second case bodies 21 and 23 are first aligned with the cutout 11 of the lower half portion 7'. The attaching members 24 are placed on top of the support projections 29. In this state, screws 30 (see FIG. 4) are put in the holes 24a of the attaching members 24. The screws 30 are then screwed into the threaded holes 29a of the support projections 29. This secures the pen accommodation case 19 to the lower half portion 7'.

With the pen accommodation case 19 fixed to the lower half portion 7', the upper and lower half portions 7 and 7' are put together. This places the pen accommodation case 19 inside the main enclosure 8 in such a manner that the first and second concave portions 20 and 22 open at the back wall 10 of the main enclosure 8. Because the left-hand end of the pen accommodation case 19 is positioned at the aperture 12a of the left-hand side wall of the main enclosure 8, the first concave portion 20 opens at its left-hand end.

Reference numbers 31 and 32 indicate holding members. Each member comprises an attaching part 33, a small rectangular plate elongated sideways. An elastic arm 34 projects backward from the rear center of the bottom of each attaching part 33. The components of the members 33 and 34 are made integrally of synthetic resin.

The elastic arms 34 are each bent upward at their base to have an approximate L shape when viewed sideways. The longitudinal center of each elastic arm 34 is bent in a gentle arc downward and then backward. On top of the rear end of each elastic arm 34 is a holding lump 35 which is substantially hemispheric in shape.

Each attaching part 33 has on its left- and righthand sides two support holes 33a vertically penetrating therethrough. One holding member 31 (called the first holding member) has a cutout 33b gouged into the attaching part 33. The cutout 33b is located in the crosswise middle of the attaching part 33 and close to where the elastic arm 34 is formed.

Reference numerals 36 indicate two check pawls located at the bottom rear end of the elastic arm 34 belonging to the first holding member 31. The check pawls 36 are slightly separated sideways from each other. These pawls are used to restrict the position of a U-shaped spring, to be described later, at one of its ends.

The elastic arm 34 of the first holding member 31 is to be positioned in the right-hand holding piece accommodation hole 26 formed on the pen accommodation case 19, and the elastic arm 34 of the other holding member 32 (called the second holding member) is to be positioned in the left-hand holding piece accommodation hole 26. The positioning is accomplished by first putting the projections 27 all the way into the corresponding support holes 33a of the attaching parts 33, the projections 27 belonging to the support member 25 of the pen accommodation case 19. Then the protruded portions of the projections 27 under the attaching parts 33 are thermally crimped. This allows the holding members 31 and 32 to be supported securely by the support member 25 of the pen accommodation case 19.

With the holding members 31 and 32 supported by the pen accommodation case 19, the top front half of each elastic arm 34 is located approximately on the same plane as the inner surface of the bottom wall 21a of the first case body 21. The holding lumps 35 project into the first concave portion 20 (see FIG. 6). When viewed from above, the cutout 33b formed on the attaching part 33 of the first holding member 31 conforms substantially to the cutout 25a of the support member 25.

Reference numeral 37 denotes a horseshoe-shaped spring. The intermediate portion of the spring 37 passes through the cutouts 25a and 33b. The spring 37 has one of its ends 37a positioned elastically between the check pawls 36 under the elastic arm 34 of the first holding member 31. The other end 37b of the spring 37 is positioned elastically among the three check members 28a, 28b and 28b on top of the top wall 21c of the first case body 21 (see FIG. 7). When the spring 37 is thus in place, its two ends 37a and 37b are slightly separated from each other. With its elastic force, the spring 37 pushes the top rear end of the elastic arm 34 of the first holding member 31 into the first concave portion 20.

Because the holding members 31 and 32 are separated on the left- and right-hand side inside the first concave portion 20 of the pen accommodation case 19, the input pen 5 is held securely at two points by these members 31 and 32.

The input pen 5 is inserted to and removed from the input pen accommodation mechanism 3 as follows. First, the input pen 5 is held by fingertips horizontally, with its end 16a to the left. Then the input pen 5 excluding its other end 16a and its flange 18 is positioned opposite to the concave portions 20 and 22 of the pen accommodation case 19. From that position, the input pen 5 is pushed into the concave portions 20 and 22.

Figure 6:
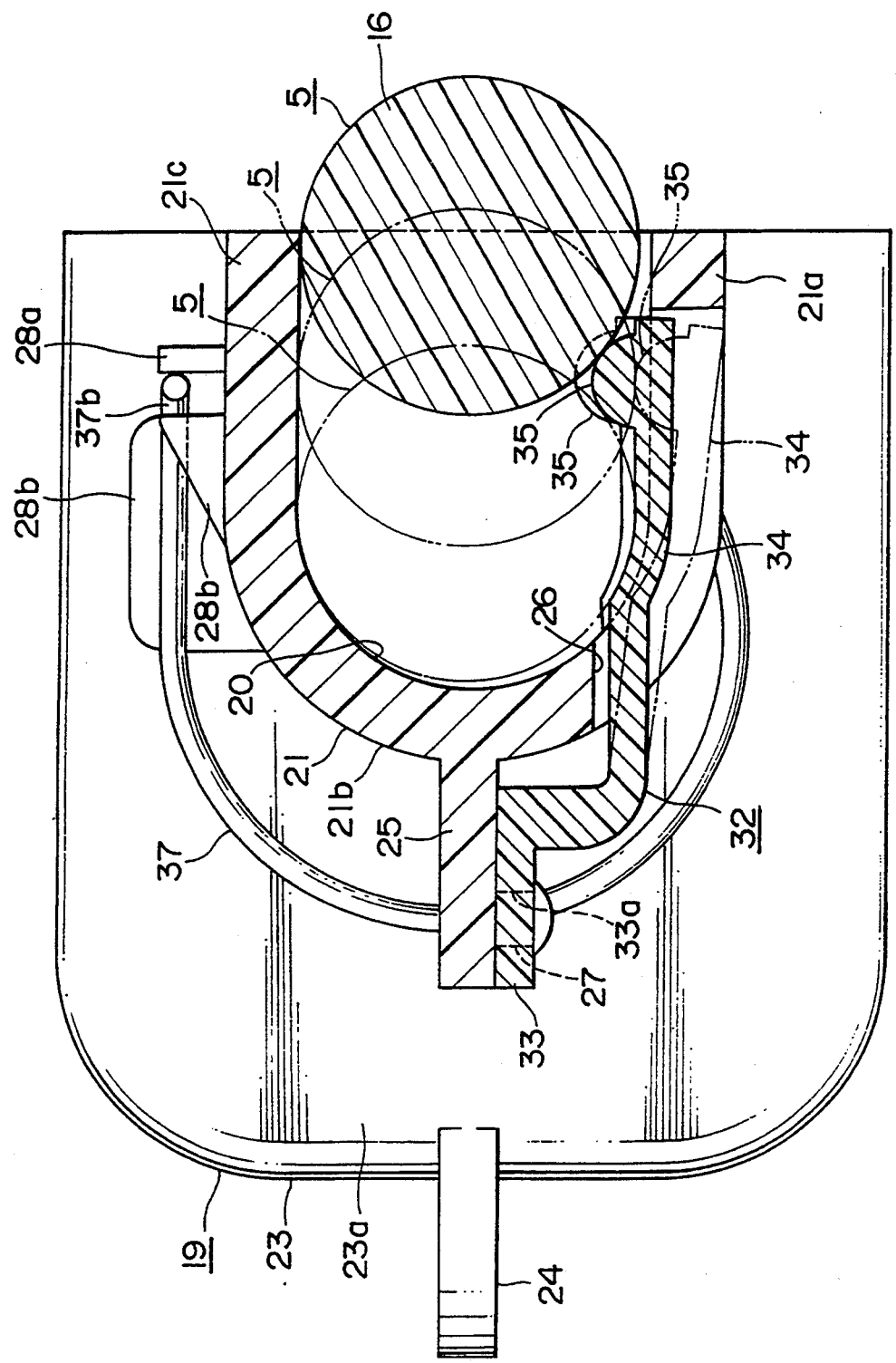
FIG. 6 is an enlarged cross-sectional view taken on line VI—VI of FIG. 3.
Figure 7:
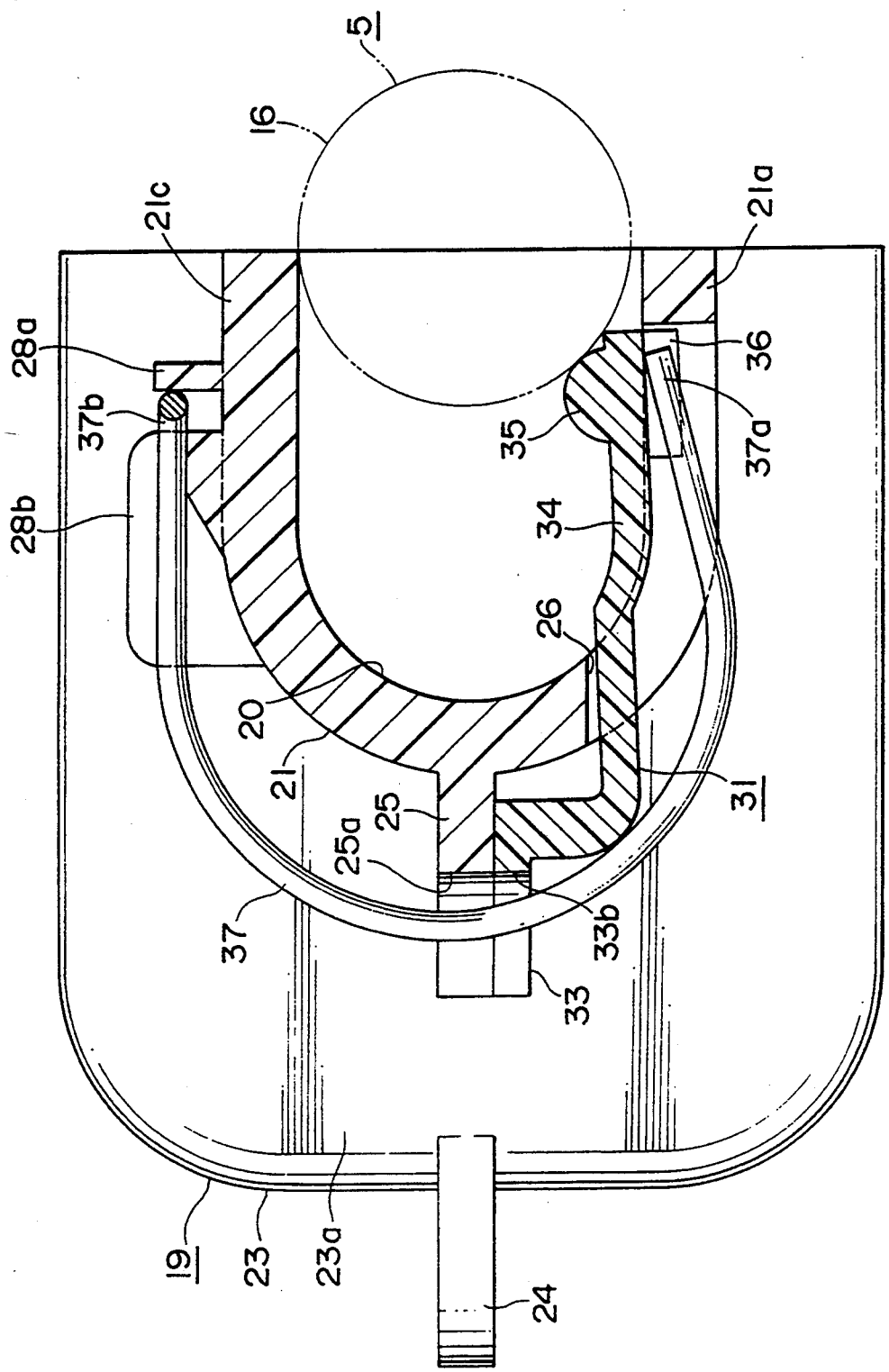
FIG. 7 is an enlarged cross-sectional view taken on line VII—VII of FIG. 3 before the input pen is accommodated in the pen accommodation part.
Figure 8:
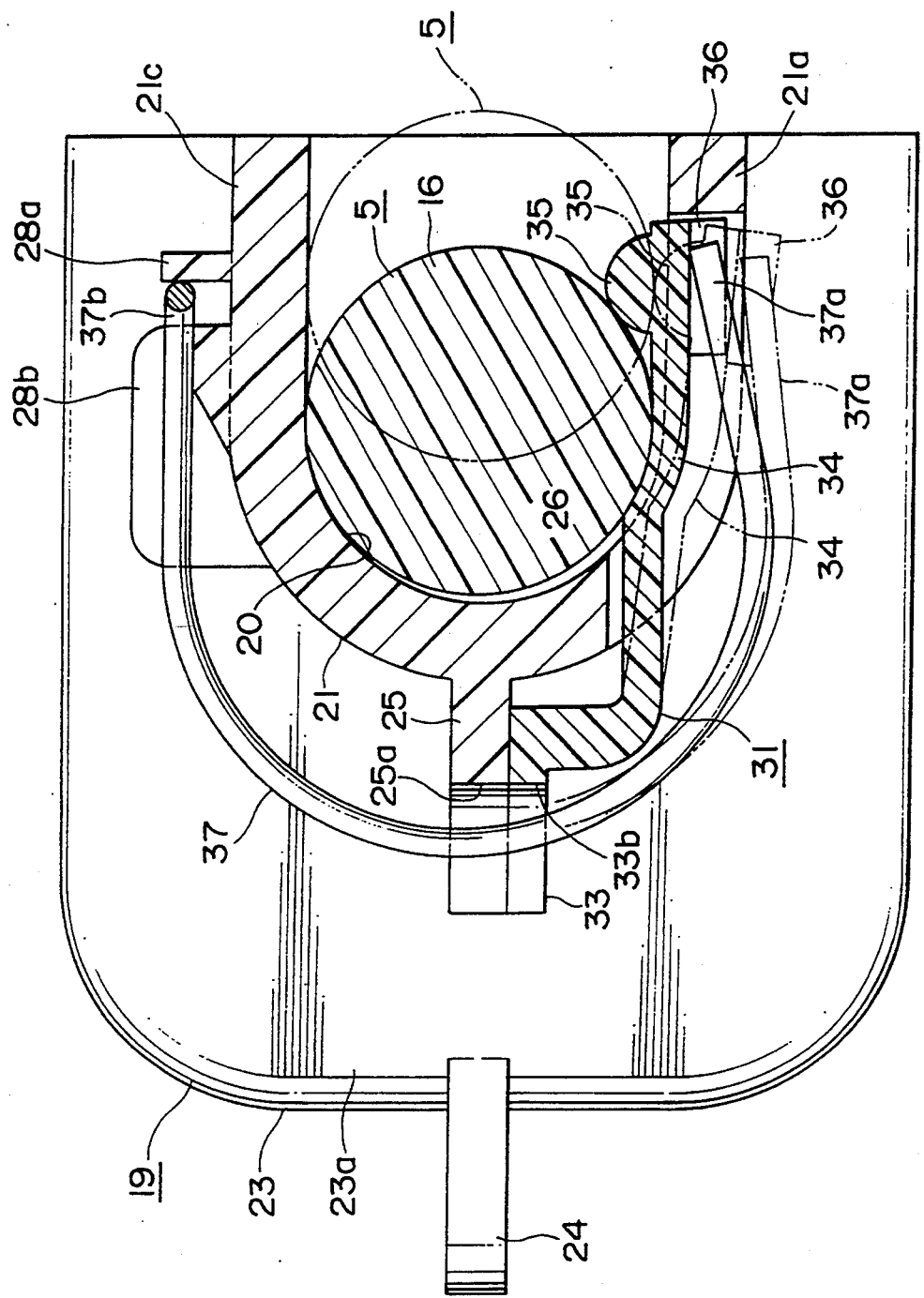
FIG. 8 is an enlarged cross-sectional view taken on line VIII—VIII of FIG. 3 with the input pen accommodated in the pen accommodation part.
Figure 9:
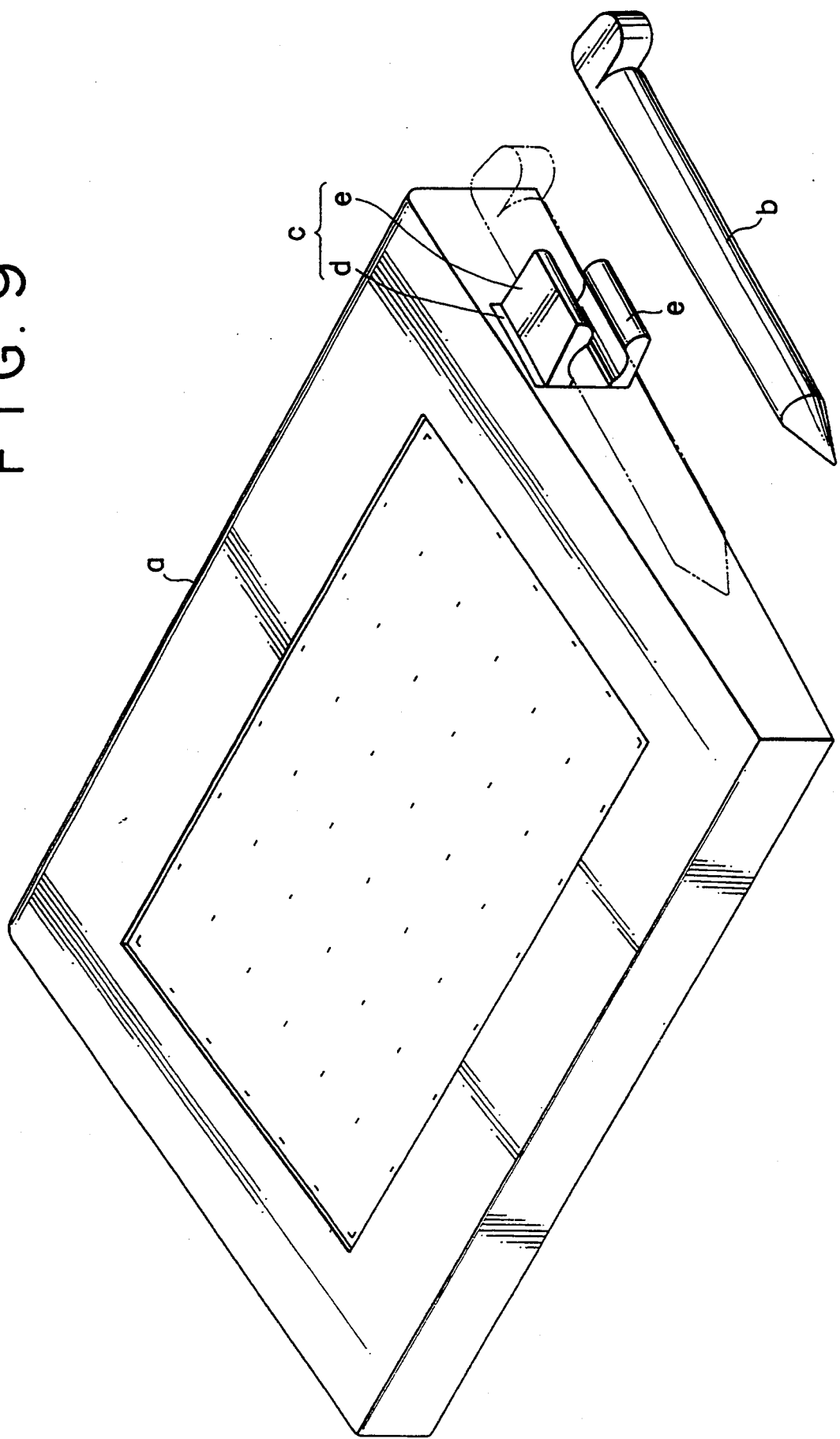
FIG. 9 is a perspective view of a typical related art input pen accommodation mechanism for use with a tablet input apparatus.
Figure 10:
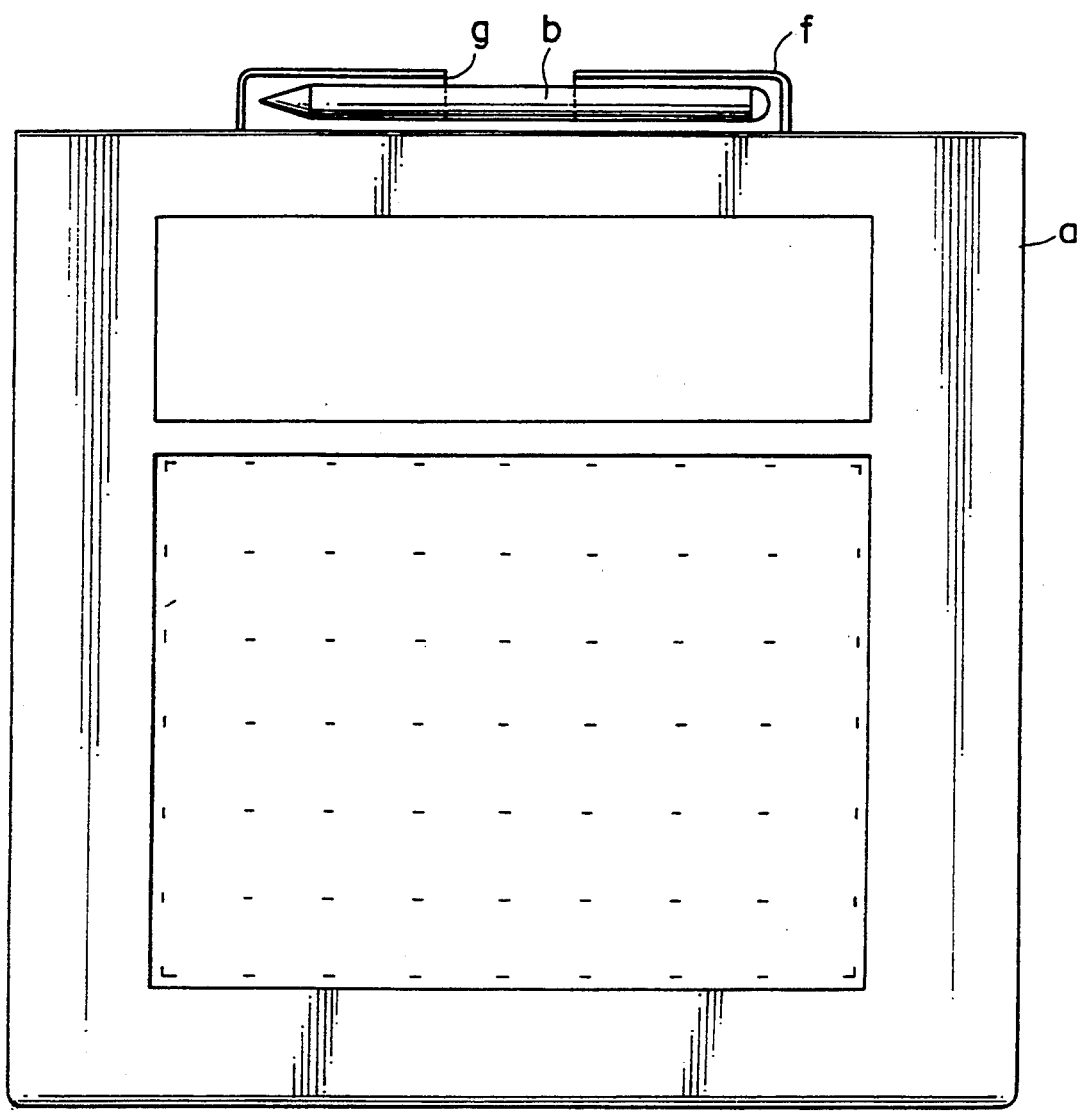
FIG. 10 is a plan view of another typical related art input pen accommodation mechanism for use with a tablet input apparatus.

When the input pen 5 is pushed into the first concave portion 20, the main portion 16 of the pen first comes to the position indicated by solid line in FIG. 6. The main portion 16 pushes the holding lumps 35 of the holding members 31 and 32 approximately downward, as depicted in FIG. 7. This causes the elastic arms 34 to bend first downward, as indicated by two-dot chain line in FIGS. 6 and 8, and then to resume their former position (i.e., move upward) the moment the main portion 16 reaches the bottom of the first concave portion 20. As a result, the holding lumps 35 come into elastic contact with the main portion 16 of the pen partly from below and partly from the rear.

In the above state, a widened space between the two ends 37a and 37b of the spring 37 increases the elastic force of the spring 37. With its enhanced elastic force, the spring 37 causes the holding lump 35 of the first holding member 31 to give a stronger elastic contact with the input pen 5 than the holding lump 35 of the second holding member 32.

Figure 3:
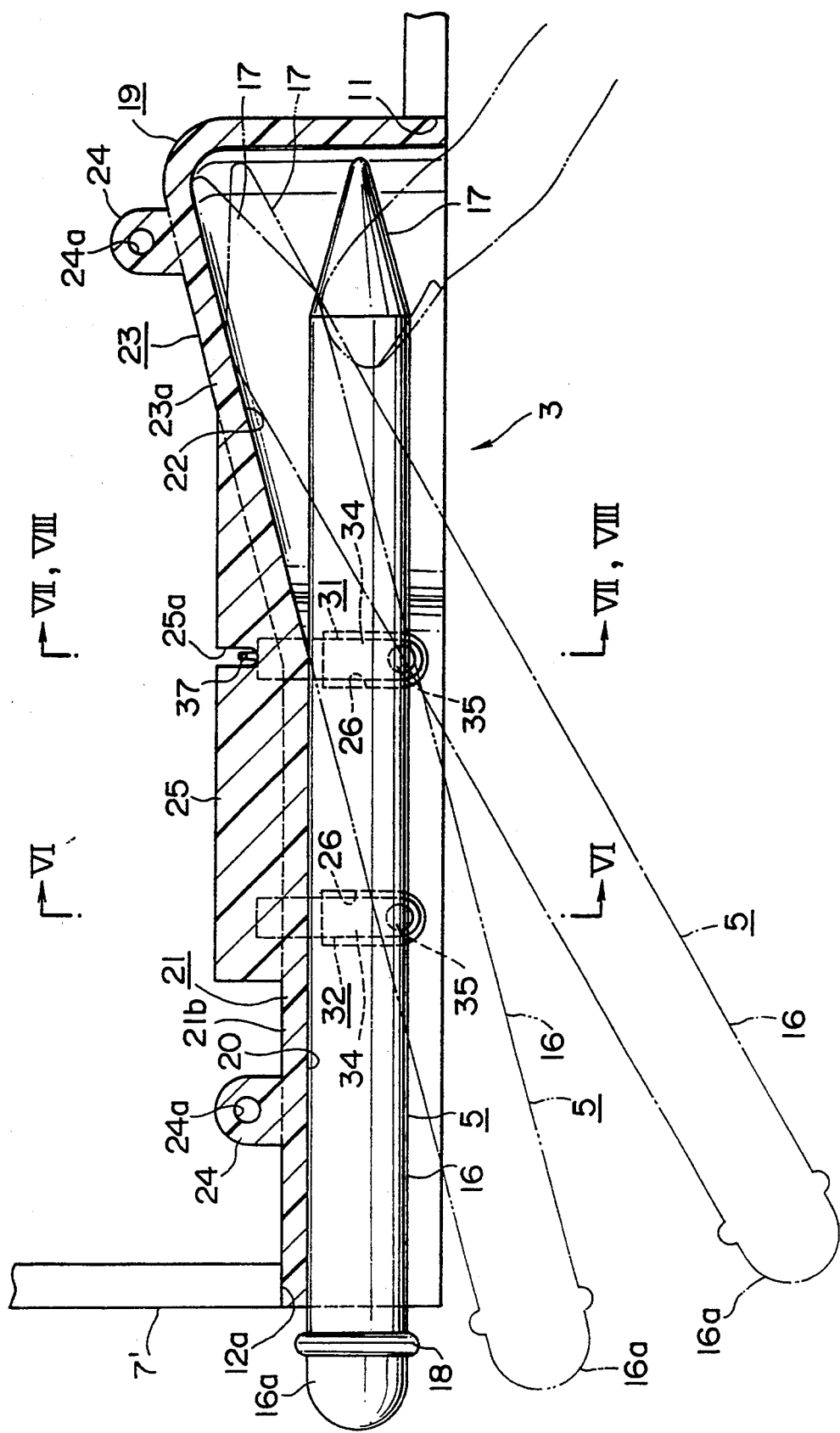
FIG. 3 is an enlarged cross-sectional view taken on line III—III of FIG. 2.

Alternatively, the input pen 5 may be pushed into the concave portions 20 and 22 of the pen accommodation case 19 in an oblique manner, i.e., tilted as shown by dashed line or by two-dot chain line in FIG. 3. This causes the elastic arm 34 of the first holding member 31 to be bent first, followed by the elastic arm 34 of the second holding member 32. The reaction force coming from the elastic arms 34 when they are bent successively is smaller than when the arms 34 are bent simultaneously.

The input pen 5 substantially as a whole is thus accommodated in the concave portions 20 and 22 of the pen accommodation case 19. In this state, the main portion 16 of the pen is held at two axially separated points by the elastic arms 34. As described, the elastic arms 34 keep the input pen 5 in place by pushing it against the interior of the first case body 21. Most of the input pen 5 is contained inside the pen accommodation case 19 and is not exposed.

The input pen 5 is removed from the concave portions 20 and 22 of the pen accommodation case 19 as follows. There are two principal ways to remove the input pen 5 from its accommodated position: either by pushing the pen end 16a backward to turn the input pen 5 counterclockwise as viewed from above, or by pushing forward that part of the input pen 5 which is located inside the second concave portion 22 so as to turn the pen 5 also counterclockwise. The input pen 5, when turned counterclockwise in the above manner, has its end 16a protruded backward out of the pen accommodation case 19. The protruded end 16a is then gripped by fingertips and turned further counterclockwise for complete removal from the pen accommodation case 19.

Any one of the above two pen-removing procedures involves a rotating motion of the input pen 5 around a fulcrum. This fulcrum is a boundary formed between the front side wall 21b of the first case body 21 and a front side wall 23a of the second case body 23. That boundary is in contact with that part of the pen which is located between the first concave portion 20 and the second concave portion 21. When pushed as described, the input pen 5 turns around the fulcrum counterclockwise as viewed from above.

The turning of the input pen 5 is made easy because the first holding member 31 in the first concave portion 20 is located near the second concave portion 22. As the input pen 5 is rotated counterclockwise, the elastic arm 34 of the second holding member 32 is bent downward so that that portion of the input pen 5 which was held by the elastic arm 34 is detached therefrom in the backward direction past the holding lump 35.

As shown by dashed line in FIG. 3, the input pen 5 is rotated further counterclockwise with its conical part 17 contacting the right-hand end of the front side wall 23a of the second case body 23, the contact point serving as a fulcrum for the rotation. Thus with the elastic arm 34 of the first holding member 31 bent downward, that portion of the input pen 5 which was held by the arm 34 is detached therefrom in the backward direction. In this manner, the holding of the input pen 5 by the two holding members 31 and 32 is disengaged.

The input pen 5 is released first from the second holding member 32 and then from the first holding member 31. It should be noted that the distance between the manually gripped position of the pen 5 and its fulcrum is greater than the distance between the holding member 31 or 32 and the fulcrum of the pen 5. The difference between these distances allows the input pen 5 to be rotated with a relatively small force against the pen-holding force.

When the input pen 5 is to be detached first from the second holding member 32, the distance between the manually gripped position of the pen 5 and its fulcrum is about twice the distance between the second holding member 32 and the fulcrum of the pen 5. In this case, the reaction from the second holding member 32 is small enough to be overcome with only a modest effort. When the input pen 5 is to be detached afterwards from the first holding member 31, the distance between the manually gripped position of the pen 5 and its fulcrum is about three times the distance between the first holding member 31 and the fulcrum of the pen 5. Although the first holding member 31 has a greater holding force than the second holding member 32, the latter case also involves only a modest effort for pen removal thanks to the three-fold difference between the above-described distances.

Instead of being rotated as described, the input pen 5 may be removed alternatively by getting pulled out axially through the left-hand side aperture 12a of the main enclosure 8. Any one of these pen-removal procedures may be adopted at the operator's discretion under the circumstances.

As described, the input pen accommodation mechanism for the tablet input apparatus according to the invention comprises the pen accommodation part for accommodating the input pen, and the holding means for holding the input pen as accommodated in that pen accommodation part. The pen accommodation part is constituted by the first concave portion and the second concave portion deeper than the first concave portion, the two concave portions being connected lengthwise. The holding means is located within the first concave portion so as to pinch the input pen sideways within the pen accommodation part.

When the input pen is accommodated within the concave portions of the inventive input pen accommodation mechanism, most of the input pen is not exposed. This structure drastically reduces the possibility of the input pen getting dislodged and falling from its accommodated position upon contact with nearby objects. It follows that only a minimum mechanical force is needed to keep the accommodated input pen in place. Hence no extra effort is required to attach and remove the input pen to and from the pen accommodation part; to do so is easy and comfortable.

Because the pen accommodation part is made of the two concave portions of different depths, removal of the input pen therefrom is made easier. That is, that part of the input pen which is located in the deeper, second concave portion is first pushed in by fingertips. The pushing action causes the input pen to rotate around a fulcrum formed by the boundary between the first and the second concave portions. Upon rotation, that part of the input pen which is located in the first concave portion is lifted therefrom. The lifted end of the input pen is then gripped by fingers and the entire input pen is detached with ease.

In the above-described embodiment, the vertical width of the second concave portion is made greater than the diameter of the input pen. This allows fingertips to be inserted there without constraint, which makes the turning of the pen around its fulcrum easier.

With the above embodiment, one end of the input pen is exposed from the main enclosure when the pen is accommodated in the input pen accommodation mechanism. Alternatively, the entire input pen may be accommodated inside the mechanism. In that case, too, there is no appreciable impediment to removing the input pen in an easy and comfortable manner.

With the above embodiment, the spring is furnished to that one of the two holding means which is located near the fulcrum position around which the input pen is turned for removal. The spring makes the holding force of that means higher than that of the other holding means. The staggered levels of the pen holding force with the two holding means make it easer for the pen to be detached successively from one means and then from the other for removal.

Although the description above contains many specificities, these should not be construed as limiting the scope of the invention but as merely providing illustrations of the presently preferred embodiment of this invention. For example, although the pen accommodation case is formed independently of the tablet input apparatus enclosure for later attachment thereto, the case and the enclosure may alternatively be formed integrally. As another alternative, the main portion of the input pen may be other than cylindrical.

Thus the scope of the invention should be determined by the appended claims and their legal equivalents, rather than by the examples given.

What is claimed is:

1. An input pen accommodation mechanism for use with a tablet input apparatus, said input pen accommodation mechanism comprising:
    a pen accommodation part for accommodating an input pen for coordinate data input; and
    holding means for holding said input pen as accommodated in said pen accommodation part, said holding means being in elastic contact with said input pen;
    wherein said pen accommodation part is constituted by a first concave portion and a second concave portion deeper than said first concave portion, said first and said second concave portions being connected lengthwise, said holding means being located within said first concave portion so as to pinch said input pen sideways within said pen accommodation part.

2. An input pen accommodation mechanism for use with a tablet input apparatus according to claim 1, wherein said holding means within said first concave portion is located close to said second concave portion.

3. An input pen accommodation mechanism for use with a tablet input apparatus according to claim 2, wherein said holding means is located near the boundary between said first and said second concave portions.

4. An input pen accommodation mechanism for use with a tablet input apparatus according to claim 1 or 2, wherein said holding means is constituted by a first and a second holding member, said second holding member acting as an auxiliary to said first holding member, said first and said second holding members being disposed within said first concave portion and set apart lengthwise.

5. An input pen accommodation mechanism for use with a tablet input apparatus according to claim 4, wherein said first holding member has a greater holding force for keeping said input pen in place than said second holding member.

6. An input pen accommodation mechanism for use with a tablet input apparatus according to claim 4, wherein pushing one end of said input pen into said second concave portion causes said input pen to disengage from said first holding member and then to rotate around said second holding member acting as a fulcrum.

7. An input pen accommodation mechanism for use with a tablet input apparatus according to one of claims 1, 2, or 3, wherein the width of said first concave portion is greater than that of said second concave portion.

8. An input pen accommodation mechanism for use with a tablet input apparatus according to one of claims 1, 2, or 3, wherein said pen accommodation part is furnished to one side of the enclosure of said tablet input apparatus.

9. An input pen accommodation mechanism for use with a tablet input apparatus according to claim 4, wherein the width of said first concave portion is greater than that of said second concave portion.

10. An input pen accommodation mechanism for use with a tablet input apparatus according to claim 4, wherein said pen accommodation part is furnished to one side of the enclosure of said tablet input apparatus.

11. An input pen accommodation mechanism for use with a tablet input apparatus according to claim 5, wherein the width of said first concave portion is greater than that of said second concave portion.

12. An input pen accommodation mechanism for use with a tablet input apparatus according to claim 5, wherein said pen accommodation part is furnished to one side of the enclosure of said tablet input apparatus.

13. An input pen accommodation mechanism for use with a tablet input apparatus according to claim 6, wherein the width of said first concave portion is greater than that of said second concave portion.

14. An input pen accommodation mechanism for use with a tablet input apparatus according to claim 6, wherein said pen accommodation part is furnished to one side of the enclosure of said tablet input apparatus.

15. An input pen accommodation mechanism for use with a tablet input apparatus according to claim 7, wherein the width of said first concave portion is greater than that of said second concave portion.

16. An input pen accommodation mechanism for use with a tablet input apparatus according to claim 7, wherein said pen accommodation part is furnished to one side of the enclosure of said tablet input apparatus.

17. An input pen accommodation mechanism for use with a tablet input apparatus according to claim 5, wherein pushing one end of said input pen into said second concave portion causes said input pen to disengage from said first holding member and then to rotate around said second holding member acting as a fulcrum, and further wherein the width of said first concave portion is greater than that of said second concave portion.

18. An input pen accommodation mechanism for use with a tablet input apparatus according to claim 5, wherein pushing one end of said input pen into said second concave portion causes said input pen to disengage from said first holding member and then to rotate around said second holding member acting as a fulcrum, and further wherein said pen accommodation part is furnished to one side of the enclosure of said tablet input apparatus.

19. An input pen accommodation mechanism for use with a tablet input apparatus according to claim 5, wherein pushing one end of said input pen into said second concave portion causes said input pen to disengage from said first holding member and then to rotate around said second holding member acting as a fulcrum, and further wherein the width of said first concave portion is greater than that of said second concave portion, and said pen accommodation part is furnished to one side of the enclosure of said tablet input apparatus.

20. An input pen accommodation mechanism for use with a tablet input apparatus according to claim 6, wherein the width of said first concave portion is greater than that of said second concave portion, and further wherein said pen accommodation part is furnished to one side of the enclosure of said tablet input apparatus.

21. An input pen accommodation mechanism for use with a tablet input apparatus according to claim 5, wherein the width of said first concave portion is greater than that of said second concave portion, and further wherein said pen accommodation part is furnished to one side of the enclosure of said tablet input apparatus.

22. An input pen accommodation mechanism for use with a tablet input apparatus according to claim 4, wherein the width of said first concave portion is greater than that of said second concave portion, and further wherein said pen accommodation part is furnished to one side of the enclosure of said tablet input apparatus.

* * * * *